R. J. LONG.
LOGGING GRIP HOOK.
APPLICATION FILED JULY 31, 1912.
1,050,479.
Patented Jan. 14, 1913.
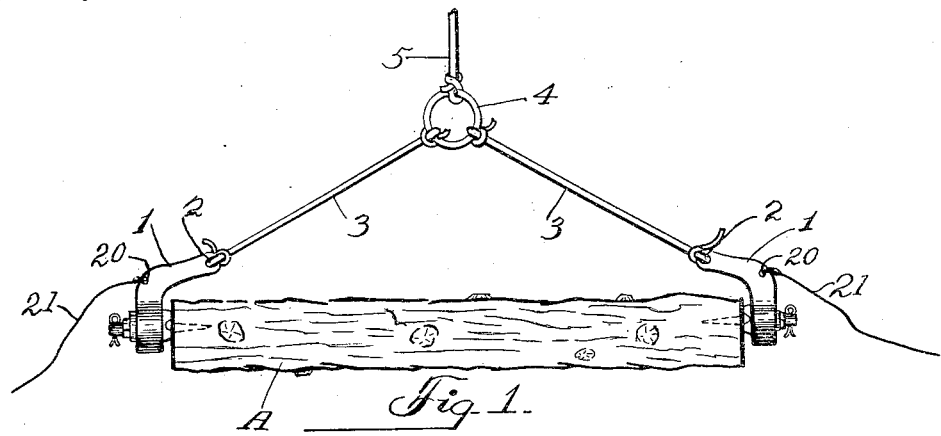
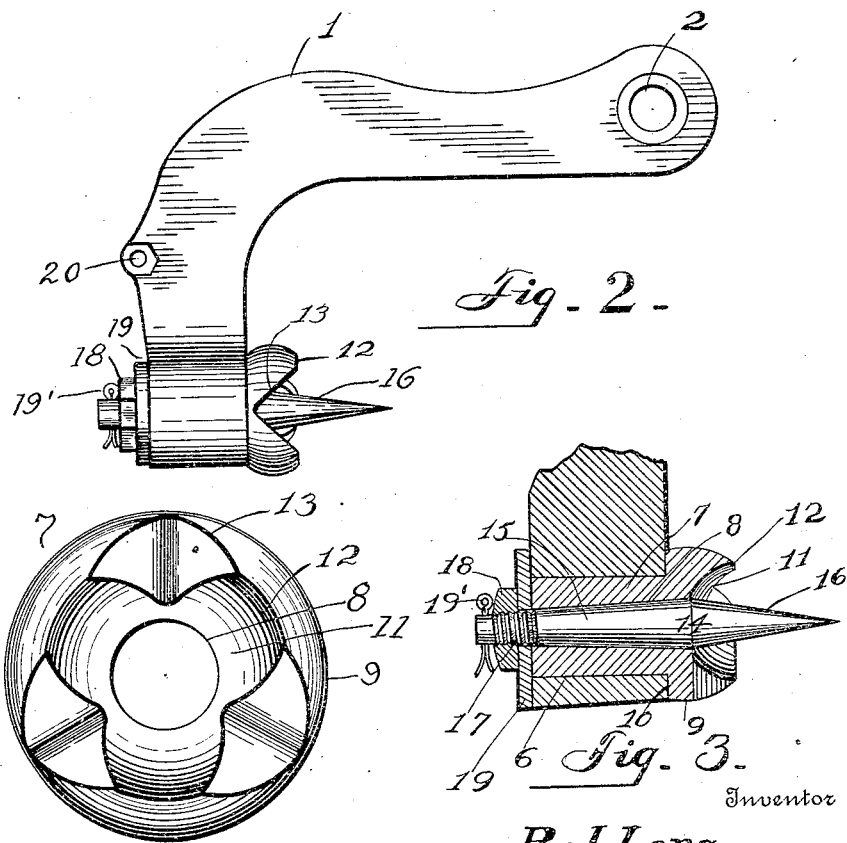

UNITED STATES PATENT OFFICE.

ROBERT J. LONG, OF FULLERTON, LOUISIANA.

LOGGING GRIP-HOOK.

1,050,479.  Specification of Letters Patent.  Patented Jan. 14, 1913.

Application filed July 31, 1912. Serial No. 712,459.

*To all whom it may concern:*

Be it known that I, ROBERT J. LONG, a citizen of the United States, residing at Fullerton, in the parish of Vernon and State of Louisiana, have invented certain new and useful Improvements in Logging Grip-Hooks, of which the following is a specification.

The invention relates to grip hooks used for handling logs and has for its object the provision of a hook consisting of the usual L-shaped shank provided with an eye in which is mounted a sleeve provided with a cup and a tapered longitudinal opening in which is secured a pointed tooth having its shank tapered to engage the tapered opening in the sleeve, said sleeve being held in engagement with the eye in the hook shank and the tooth in engagement with the sleeve by means of a nut and washer mounted on the terminal of the tooth shank. The sleeve is formed with a cup surrounding the tapered portion of the tooth and the walls of the cup are formed with notches that divide the edge of the cup into a series of engaging points that act in conjunction with the tooth to engage the log, and the notches also prevent a deposit of resin within the cup, or in any event provide for easy removal of any resin that may be deposited therein.

My invention will be described in detail hereinafter and illustrated in the accompanying drawings, in which, Figure 1 is a side view in elevation of a log showing a pair of my improved grip hooks in engagement therewith; Fig. 2, a side view in elevation of one of the grip hooks; Fig. 3, a sectional view of the end of the hook shank showing the sleeve and cup in longitudinal section and the gripping tooth in elevation; and Fig. 4, an end view of the sleeve on an enlarged scale.

In the drawings similar reference characters will be used to designate corresponding parts throughout the several views.

My improved grip hook is provided with a shank 1 essentially L-shaped in contour and having one of its arms provided with a transverse opening 2 in which is secured one of the terminals of the flexible member 3, the other end of said flexible member being secured to a ring or other suitable device 4, and 5 indicates a flexible member adapted to be connected with any source of power (not shown). As shown in Fig. 1, the grip hooks are secured in pairs to the ring 4 by means of the flexible members 3, one of each pair of hooks being adapted to engage one end of a log A while in operation. The shank 1 of each grip hook is provided with an eye 6 in the terminal farthest removed from the opening 2 heretofore described in which is revolubly mounted a sleeve 7 having a central tapered bore 8 and one of its ends formed with an enlarged head 9 forming shoulders 10 that engage the surface of the inner side of the shank, said head 9 being hollowed out as shown at 11 to form a cup surrounding the opening 8 and the walls of said cup are divided into a series of points 12 by means of notches 13.

14 indicates an engaging tooth having a tapered shank 15 adapted to engage the tapered opening 8 and a conical pointed end 16. The terminal of the shank 15 is threaded as shown at 17 to receive a nut or other securing member 18, and 19 indicates a washer interposed between the nut 18 and the body of the shank of the grip hook to prevent displacement of the sleeve 7 from said shank.

19′ indicates a split pin or other suitable fastening to prevent accidental displacement of the nut 18 from the end of the shank 15.

20 indicates an opening in the shank 1 to receive a trip line 21 to disengage the hook from the end of the log.

In operation the hooks are secured on the ends of the log as shown in Fig. 1, the tapered point 16 entering the log while the points 12 on the edges of the cup 11 also engage the log and assist in supporting the log while being moved. It will be understood that, as the sleeve 7 carrying the points 12, aforesaid, is revolubly mounted in the opening 2, said sleeve will rotate with the log to permit its heaviest portion hanging downwardly and thus relieve the hooks from tensional strain.

One of the disadvantages of devices of the character of the present invention is that resin and other gums exuded from the logs become deposited in the cups surrounding the engaging teeth and clog them up, and make it necessary to clean them out frequently to keep them clear thereof. By the construction of my invention with the walls of the cup provided with notches as shown and described, the resin will either run out through said notches or can be very easily displaced from the cup through said notches.

It will also be apparent that by constructing the sleeve and tooth so that they may be dismembered from one another and from the shank, it will be apparent that should either of the three parts become useless the other parts may be used in conjunction with the new part.

Having thus described my invention, what I claim is:—

1. A grip hook comprising a shank having an eye in one of its terminals, a sleeve removably mounted in said eye and provided with a cup on one of its extremities, and an engaging tooth mounted in said sleeve concentrically with said cup.

2. In a logging grip hook, a shank having an eye in one of its terminals, a sleeve removably mounted in said eye and provided with a longitudinal tapered bore, a pointed tooth having a tapered shank mounted in said tapered bore, and means to secure said sleeve and tooth in the eye of the shank.

3. In a logging grip hook, a shank having an eye in one of its terminals, a sleeve removably mounted in said eye, one terminal of said sleeve being provided with a head formed with a concavity, the walls of said concavity being formed with notches, and a tooth mounted in said sleeve and having a pointed end extending outwardly from said concavity.

4. In a logging grip hook, a shank provided with an eye, a sleeve removably mounted in said eye and having a longitudinal tapered bore, one terminal of said sleeve being provided with an enlarged head having its outer surface concave, the walls of said concavity formed with notches dividing said walls into a series of engaging points, a pointed tooth extending from the base of said concavity, said tooth being provided with a tapered shank engaging the tapered opening in the sleeve, and means to secure said sleeve and tooth in the eye of the shank.

5. In a logging grip hook, a shank provided with an eye, a sleeve removably mounted in said eye and having a longitudinal tapered bore, one terminal of said sleeve being provided with an enlarged head having its outer surface concave, the walls of said concavity formed with notches dividing said walls into a series of engaging points, a pointed tooth extending from the base of said concavity, said tooth being provided with a tapered shank engaging the tapered opening in the sleeve, the end of said shank being threaded, a washer mounted on the threaded end of said toothed shank, said washer engaging said sleeve and the shank of the hook, and the threaded member engaging the threaded end of said toothed shank and the washer to hold the parts in an assembled position.

In testimony whereof I affix my signature in presence of two witnesses.

ROBERT J. LONG.

Witnesses:
J. E. MAYO,
W. B. CROZIER.

---

Copies of this patent may be obtained for five cents each, by addressing the "Commissioner of Patents, Washington, D. C."